United States Patent
McBee et al.

[11] 4,022,626
[45] May 10, 1977

[54] STRUCTURAL MATERIAL

[75] Inventors: William C. McBee; Thomas A. Sullivan, both of Boulder City; Oliver B. Patrick, Henderson, all of Nev.

[73] Assignee: The United States of America as represented by the Secretary of the Interior, Washington, D.C.

[22] Filed: Aug. 22, 1975

[21] Appl. No.: 606,803

[52] U.S. Cl. .................. 106/15 FF; 106/287 SC; 264/322; 264/330; 264/331
[51] Int. Cl.$^2$ .................. B29C 5/00; C09K 3/28
[58] Field of Search .......... 264/331, 330, 333, 241, 264/299, 319, 322, DIG. 31, DIG. 32; 260/42.14, 878, 139, 29.1; 106/287 SC, 70, 15 FP

[56] References Cited
UNITED STATES PATENTS

| | | | |
|---|---|---|---|
| 1,699,694 | 1/1929 | Ellis | 106/70 |
| 2,993,799 | 7/1961 | Blake | 264/330 |
| 3,053,680 | 9/1962 | Parker et al. | 264/330 |
| 3,304,197 | 2/1967 | Pundsack et al. | 260/42.14 |
| 3,356,779 | 12/1967 | Schulze | 264/333 |
| 3,465,064 | 9/1969 | Signouret | 260/878 R |
| 3,632,566 | 1/1972 | Coleman | 260/139 |
| 3,730,850 | 5/1973 | Louthan | 260/139 |
| 3,823,019 | 7/1974 | Dale et al. | 106/287 SC |

*Primary Examiner*—Jeffery R. Thurlow
*Attorney, Agent, or Firm*—William S. Brown; Donald A. Gardiner

[57] ABSTRACT

A composite structural material is prepared by admixing (1) sulfur plasticized by reaction with dicyclopentadiene, or dicyclopentadiene and styrene, (2) asbestos fibers wetted with dipentene and (3) silica flour, maintaining the mixture at about 120 to 150° C for about 0.5 to 5 minutes and casting the resulting product under a pressure of about 500 to 1500 psi. Additional strength is obtained by curing at elevated temperature prior to casting.

4 Claims, No Drawings

STRUCTURAL MATERIAL

The transporting and handling of troublesome fluids such as acidic sewer wastes, industrial leach solutions, salt solutions, and acidic mine wastes is generally accomplished in concrete or transite type pipe. These materials are subject to corrosion by the reaction of the fluids with the cement binder material. This results in the disintegration of the pipe which then has to be replaced. Sulfur-containing or sulfur-treated structural materials have also been utilized for such purposes, but these have also been subject to corrosive attack, as well as cracking or disintegration.

It has now been found, according to the present invention, that a structural material of high strength and corrosion resistance may be prepared by forming a composite of plasticized molten elemental sulfur, a wetting agent, asbestos fiber and silica flour. Strength properties are further enhanced by utilization of a pressure casting technique in formation of the structural material, which may be in any conventional form such as flat plates or tiles, bricks, pipe sections, etc. The structural materials of the invention may be used for forming tanks or vents for holding leach or pickling solutions, for lining dumps or waste disposal pits, for pipes or tiles for handling acidic sewer waste waters or corrosive industrial liquors, flooring material for industrial plants and as patch material for concrete floors or walls.

The elemental sulfur may be commercial grade, crystalline or amorphous. Either primary or recovered sulfur can be used. It is preferably employed in an amount of about 45 to 55 percent by weight of the composition, with the optimum amount depending on proportions of the other ingredients, as well as the intended use of the composite material. Since the sulfur is employed in molten form, particle size is generally not significant.

The sulfur is initially plasticized by reaction with dicyclopentadiene at a temperature of about 120° to 150° C. Commercial grade dicyclopentadiene may be used, and in an amount of about 1 to 10 percent by weight, based on the total composite composition. Generally, a reaction time of about 15 minutes to 2 hours is sufficient, the optimum time depending on reaction temperature. The resulting plasticized sulfur is very efficient in binding and strengthening the other ingredients of the composition, i.e., asbestos fibers and silica flour. Plasticization of the sulfur by this means has been found to be essential in order to prevent conversion of the sulfur from the monoclinic to the orthorhombic form on cooling, with a resulting embrittlement of the material. In addition, the dicyclopentadiene serves to impart fire retardant qualities to the product.

It has also been found that the use of styrene, in addition to the dicyclopentadiene, as a plasticizer for the sulfur generally results in still further increased strength of the composite. Thus, when a higher strength material is desired, a combination of dicyclopentadiene and up to about 5 percent styrene, based on the total composite composition, is used in the plasticization reaction.

The asbestos is used in the form of short fibers, i.e., about 0.05 to 0.2 inch in length, with grades of about 5 to 7, e.g., chrysotile, being preferred. It is used in an amount of about 8 to 12 percent of the total composition, with the optimum amount again depending on the proportions of the other ingredients as well as the intended use of the product. Its function in the composite is chiefly that of a flexural or shear strengthening agent. Prior to incorporation in the composite, the asbestos fibers are wetted with dipentene to ensure good bonding between the asbestos and the sulfur. The dipentene may also be of commercial grade. Generally, about 0.5 to 5 percent of dipentene, based on the total composite, is sufficient to effect thorough wetting of the asbestos fibers. This is most readily and efficiently accomplished by refluxing the dipentene over the asbestos at a temperature of about 140° C until the fibers have been thoroughly wetted.

The silica flour, which serves primarily as an inert filler, is generally employed in a particle size of about −200 to −325 mesh, and in an amount of about 25 to 40 percent of the total composite. However, optimum values of both particle size and amount may vary considerably, depending on intended use.

The above ingredients, i.e., the plasticized sulfur, wetted asbestos fibers and silica flour are then mixed together in any suitable mixing vessel or apparatus at a temperature of about 120° to 150° C for a period sufficient to ensure thorough mixing and interaction of the components of the composite. A period of about 0.5 to 5 minutes may be employed, with a period of about 1 to 2 minutes generally being sufficient.

The resulting composite material constitutes a thermoplastic mixture which upon solidification forms a rigid, high strength, corrosion-resistant and fire-resistant structural material suitable for use in the above-discussed applications. However, the strength of the material can be still further considerably enhanced by utilization of a pressure casting technique. Thus, the composite material formed from mixing the three essential ingredients at elevated temperature, as discussed above, is preferably cast at a temperature of about 120° to 150° C under a pressure of about 500 to 1500 psi for a period of up to about 0.5 hour.

It has also been found that the strength of composite materials of the invention can generally be still further enhanced by utilization of a curing period following mixing of the ingredients and preceeding the casting step. According to this procedure, the mixture is held at a temperature of about 120° to 140° C for a period of about 1 to 48 hours, following which the products are formed by means of the above-described pressure casting techniques.

The invention will be more specifically illustrated by means of the following examples. All amounts are given as percent by weight.

EXAMPLE 1

53 percent of powdered elemental sulfur was reacted with 5 percent of dicyclopentadiene at 140° C for 1 hour. 8 percent of asbestos was wetted by refluxing with 1 percent of dipentene at 140° C. These materials plus 33 percent of silica flour (325 mesh) were mixed together for 2 minutes at 140° C. The mixture was then cast under 500 psi pressure into a 1 × 2 × 5 inch bar and the pressure maintained for 0.5 hour. It was then cooled to room temperature, and the rupture modulus of the product was found to be 2515 psi.

EXAMPLE 2

The procedure in this example was the same as that of example 1 except that a pressure of 1300 psi was used in casting. The rupture modulus of the product was found to be 3240 psi.

EXAMPLE 3

Four of the 1 × 2 × 5 inch bars prepared as in example 1 were tested for corrosion resistance. Static testing was done by immersing the bars in 1, 2 and 5 volume percent sulfuric acid solutions. A control test was made using similar bars cut from commercial Type II Asbestos-Cement sewer pipe sections. Results, shown in the following table, are given as percent loss or gain of weight after a year and 3 weeks immersion in the case of the products of example 1 and after 9 weeks in the case of the Asbestos-Cement. After the 9 weeks the Asbestos-Cement samples were so badly deteriorated that continued testing was impossible. The results show that the product of the invention is for all practical purposes unaffected by corrosion in up to 5 percent by volume sulfuric acid solutions.

| Type material | Corrosion, percent | | |
|---|---|---|---|
| | 1% $H_2SO_4$ | 2% $H_2SO_4$ | 5% $H_2SO_4$ |
| Product of Ex. 1 | − 0.14 | − 0.41 | − 0.33 |
| Type II Asbestos-Cement | +13.7 | +37.3 | +33.0 |

EXAMPLE 4

This example illustrates the importance of the dipentene in the process of the invention. The procedure was the same as that of example 2, except that 1 percent of dicyclopentadiene was substituted for the dipentene in the step of wetting the asbestos. The resulting mixture, prior to casting, was dry and difficult to mix and the final product had a rupture modulus of only 1470 psi.

EXAMPLE 5

52 percent sulfur, 3 percent dicyclopentadiene and 2 percent styrene were reacted together for 2 hours at 140° C. 10 percent of asbestos was wetted by refluxing with 1 percent of dipentene at 140° C for 2 hours. These were then mixed at 140° C with 32 percent of silica flour (325 mesh) for 2 minutes. The mixture was held at 135° C for 1, 24, and 48 hours before casting into bars at a pressure of 1300 psi for 0.5 hours. The rupture modulus for the bars cast after curing for 1, 24, and 48 hours was 1235, 3230, and 4715 psi respectively. Curing for a period of time greater than 48 hours at 135° C did not materially increase the strength.

EXAMPLE 6

52 percent of sulfur was reacted with 3 percent of dicyclopentadiene and 2 percent of styrene for 2 hours at 140° C. 10 percent of asbestos was wetted with 1 percent of dipentene by refluxing at 140° C for 2 hours. These plus 32 percent of silica flour (325 mesh) were mixed for 2 minutes at a temperature of 140° C and the mixture immediately cast into pipe molds and held under 1300 psi for 0.5 hour and then cooled to room temperature. Three of the resulting 12-inch lengths of 6-inch outside diameter pipes were tested for crushing strengths in accordance with Standard ASTM methods for Asbestos-Cement pipe. The average crushing strength of the 3 pipes was 6,180 pounds per linear foot. This value is more than double the minimum crushing strength specifications for Asbestos-Cement, clay tile, or concrete pipe. These crushing strength specifications vary from 1100 to 2600 pounds per linear foot.

We claim:

1. A process for preparation of a composite structural material comprising compounding the following ingredients: (1) plasticized sulfur prepared by reaction of about 45 to 55 percent elemental sulfur with about 1 to 10 percent of dicyclopentadiene at a temperture of about 120° to 150° C for a period of about 2 hours to 15 minutes, (2) about 8 to 12 percent of asbestos fibers wetted with about 0.5 to 5 percent dipentene and (3) about 25 to 40 percent silica flour; mixing the three ingredients at a temperature of about 120° to 150° C for a period of about 0.5 to 5 minutes; casting the admixture under a pressure of about 500 to 1500 psi and cooling the resultant composite to room temperature.

2. The process of claim 1 in which mixture of ingredients is cured at a temperature of about 120° to 140° C for a period of about 1 to 48 hours prior to casting.

3. The process of claim 1 in which the sulfur is plasticized by means of a combination of dicyclopentadiene and styrene.

4. A composite structural material prepared by the process of claim 1.

* * * * *